United States Patent [19]

Bedingfield et al.

[11] Patent Number: 5,537,654

[45] Date of Patent: Jul. 16, 1996

[54] SYSTEM FOR PCMCIA PERIPHERAL TO EXECUTE INSTRUCTIONS FROM SHARED MEMORY WHERE THE SYSTEM RESET SIGNAL CAUSES SWITCHING BETWEEN MODES OF OPERATION BY ALERTING THE STARTING ADDRESS

[75] Inventors: John Bedingfield, Largo, Fla.; Craig Matthews, Long Beach, N.J.

[73] Assignee: AT&T Corp., Murray Hill, N.Y.

[21] Appl. No.: 64,304

[22] Filed: May 20, 1993

[51] Int. Cl.$^6$ ........................................ G06F 3/00
[52] U.S. Cl. .................. 395/834; 395/500; 395/828; 395/497.01; 364/160; 364/228.1; 364/238.2; 364/243
[58] Field of Search ............................ 395/275, 500, 395/200, 834, 828, 497.01

[56] References Cited

U.S. PATENT DOCUMENTS

| | | | |
|---|---|---|---|
| 4,156,907 | 5/1979 | Rawlings et al. | 364/200 |
| 4,459,662 | 7/1984 | Skelton et al. | 364/200 |
| 4,519,032 | 5/1985 | Mendell | 364/200 |
| 4,611,202 | 9/1986 | DiNitto et al. | 340/724 |
| 4,809,269 | 2/1989 | Gulick | 370/94 |
| 4,825,358 | 4/1989 | Letwin | 364/200 |
| 5,195,130 | 3/1993 | Weiss et al. | 379/98 |
| 5,319,751 | 6/1994 | Garney | 395/200 |
| 5,321,828 | 6/1994 | Phillips et al. | 395/500 |
| 5,353,432 | 10/1994 | Riehek et al. | 395/500 |

OTHER PUBLICATIONS

Winn Rosch, *PCMCIA: The Expansion System of the Future* PC Magazine, Jan. 26, 1993, pp. 321 to 326.
European Search Report dated Sep. 9, 1994, regarding EPO Application No. EP 94 30 3539.
EP-A-0 464433 filed Jun. 15, 1991. Listed as particularly relevant if taken alone, as to claims 1-11, 15-18 on European Search Report regarding EPO Application EP 94 30 3539.
EP-A-0 268285 filed Nov. 19, 1987. Listed as technological background in European Search Report regarding EPO Application EP 94 30 3539.
EP-A-0-536 793 filed Oct. 9, 1992. Listed as technological background in European Search Report regarding EPO Application EP 94 30 3539.
"Reprogrammability Eases PCMCIA Designs" Publication: Electronic Design; publication date Apr. 18, 1994. Listed as intermediate document and technological background in European Search Report regarding EPO Application EP 94 30 3539.
"Microprogram Loading System", Patent Abstracts of Japan, Publication No. JP62025353, publication date Mar. 2, 1987, Genma Hideaki et al., Int. Class: G06F13/00; G06F9/24. Listed as technological background in European Search Report regarding EPO Application EP 94 30 3539. Translation: Abstract only.

*Primary Examiner*—Thomas C. Lee
*Assistant Examiner*—Rehana Perveen Krick
*Attorney, Agent, or Firm*—Joseph J. Opalach

[57] ABSTRACT

A "Personal Computer Memory Card International Association" (PCMCIA) peripheral, e.g., a modem, incorporates a shared memory interface to a personal computer. This shared memory interface provides the capability to easily program the PCMCIA peripheral either in the factory or in the field. In addition, the shared memory interface removes the requirement of having a resident "boot-up" code in the PCMCIA peripheral. Finally, the shared memory interface provides the capability to transfer user data from the personal computer, i.e., data terminal, to the PCMCIA modem at a higher data transfer rate than is currently available via the modem's universal asynchronous receive/transmit (UART) integrated circuit.

4 Claims, 3 Drawing Sheets

|  | LINE 151 | LINE 152 |
|---|---|---|
| NORMAL OPERATING MODE | CE1 | CE2 |
| DOWNLOAD OPERATING MODE | CE2 | CE1 |

5,537,654

SYSTEM FOR PCMCIA PERIPHERAL TO EXECUTE INSTRUCTIONS FROM SHARED MEMORY WHERE THE SYSTEM RESET SIGNAL CAUSES SWITCHING BETWEEN MODES OF OPERATION BY ALERTING THE STARTING ADDRESS

BACKGROUND OF THE INVENTION

The present invention relates to data communications equipment and, more particularly, to a modem having a "Personal Computer Memory Card International Association" interface.

The "Personal Computer Memory Card International Association" (PCMCIA) interface defines the physical size and the electrical interconnection for a class of computer peripherals, i.e., PCMCIA peripherals. Generally, the size of a PCMCIA peripheral is approximately that of a "credit card." Each credit card size PCMCIA peripheral electrically interconnects via a PCMCIA electrical connector to a "host computer," which is typically a "notebook" size personal computer (PC). PCMCIA peripherals like memory, modems, fax, hard disks, etc., are currently available.

Like their more conventional cousins, a PCMCIA modem is a complex piece of equipment that comprises specialized microprocessor circuitry. For example, a PCMCIA modem typically includes a general-purpose microprocessor (CPU), memory, a telephone line interface to the Public Switched Telephone Network (PSTN), and a high-speed digital signal processor for processing the respective communications signal in both the transmit and receive directions. The functionality of the PCMCIA modem is provided by the CPU's execution of a computer program, i.e., the "operating program," that resides in the PCMCIA modem's memory. This memory is usually "flash memory," which is a non-volatile memory that is field-programmable by the modem's CPU.

An advantage of the flash memory is that it allows field upgrades of the modem's operating program for either providing new features or "bug" fixes. In order to perform a field upgrade a part of the flash memory is reserved for a "boot block" computer program. This part of the flash memory is write-protected so that it retains its data, i.e., the boot block, even when the rest of the flash memory is erased and reprogrammed. The boot block includes computer software for booting-up the modem, e.g., after application of power, and for loading the remainder of the flash memory with the operating program.

A field upgrade of the modem's flash memory is performed over one of the serial data ports, either the data communications port or the data terminal port. First, the modem's CPU receives a command to reload the operating program from a "host" coupled to one of the serial ports. Then the modem's CPU executes that portion of the boot block associated with loading the flash memory. This part of the software first erases the remaining portion of the flash memory and then receives the new operating program via one of the serial ports and writes the new operating program to the flash memory.

An alternative approach that does not require a non-writable boot block in the flash memory is provided by AT&T Paradyne's 3800 modem, which comprises an independent "upper bank" and "lower bank" of flash memory. The modem's CPU can boot from either bank. The modem's CPU begins operation by executing the computer program stored in one of the flash memory banks, i.e., the active bank of flash memory. This computer program includes the boot code and the operating program. When the modem's CPU receives a command from the host to change the operating program via one of the serial ports, the modem's CPU executes a download program contained in the active bank of flash memory. This download software first erases the non-active bank of flash memory and then copies the received data from one of the serial data ports into the non-active bank. This received data is the new computer program, which contains new boot code and the new operating program. At the conclusion of this download mode, the modem's CPU toggles a non-volatile switch so that it will boot after a reset from the newly updated bank of flash memory, i.e., it switches which bank of flash memory is the active bank. This approach is disclosed in the co-pending, commonly assigned U.S. patent application of Hecht et al. entitled "Apparatus and Method for Downloading Programs," Ser. No. 07/880,257, filed on May 8, 1992, now pending.

As described above, although a flash memory upgrade for a PCMCIA modem via one of the serial ports is an advantageous approach, there are several limitations. One is that during manufacture the boot block must be programmed into the flash memory prior to soldering the flash memory onto the printed circuit board. This adds cost to the manufacturing process of the PCMCIA modem. In addition, if the boot block is somehow erased or corrupted and power to the PCMCIA modem is lost, there is no recovery mechanism other than removing and replacing the flash memory. Furthermore, the size of the boot block is fixed (typically 16K bytes), which presents constraints on the functionality of the boot block. In addition, the boot block similarly constrains the size of the PCMCIA modem's operating program since a portion of the flash memory is dedicated to the boot block. Finally, the speed of any field upgrade is limited because of the use of a serial data port.

SUMMARY OF THE INVENTION

This invention eliminates all of the above-mentioned limitations by providing a method and apparatus for loading a flash memory after it is a part of a completed PCMCIA modem assembly. In accordance with the principles of the invention, a PCMCIA peripheral incorporates a shared memory interface to a host computer via the PCMCIA connector. This shared memory provides the capability to easily load or change the computer program of the PCMCIA peripheral from the host computer without requiring either the a priori presence of a dedicated boot block in the flash memory or the use of a serial data port.

In an embodiment of the invention, a PCMCIA modem includes a CPU, memory, and a shared memory that is coupled to a personal computer (PC) via the PCMCIA connector. During normal operation, the CPU accesses and executes any computer program stored in the memory. A field upgrade or initial factory load is performed in the following manner. First, the PC applies a reset to the PCMCIA modem. During this reset, the PC stores a control program in the shared memory. After storing the control program, the PC alters the memory map of the PCMCIA modem so that after the reset the CPU executes the control program stored in the shared memory. This control program further provides the ability to the PCMCIA modem to transfer a new computer program via the shared memory to the memory of the PCMCIA modem, i.e., the control program is the boot block software. After transferring the new computer program, the PC again initiates a reset of the PCMCIA modem that returns the memory map of the PCMCIA modem to normal such that after the reset the CPU executes the new computer program stored in the PCMCIA modem's memory.

In accordance with a feature of the invention, neither the field upgrade nor the initial program load in the factory require any boot block software to be resident in the PCMCIA card.

Another feature of the invention uses the shared memory interface to transfer user data from the personal computer, i.e., data terminal, to the PCMCIA modem. This results in a higher data transfer rate than is currently available via the on-board universal asynchronous receive/transmit (UART) integrated circuit that couples the modem to any terminal equipment.

DETAILED DESCRIPTION

Figures 1, 2:
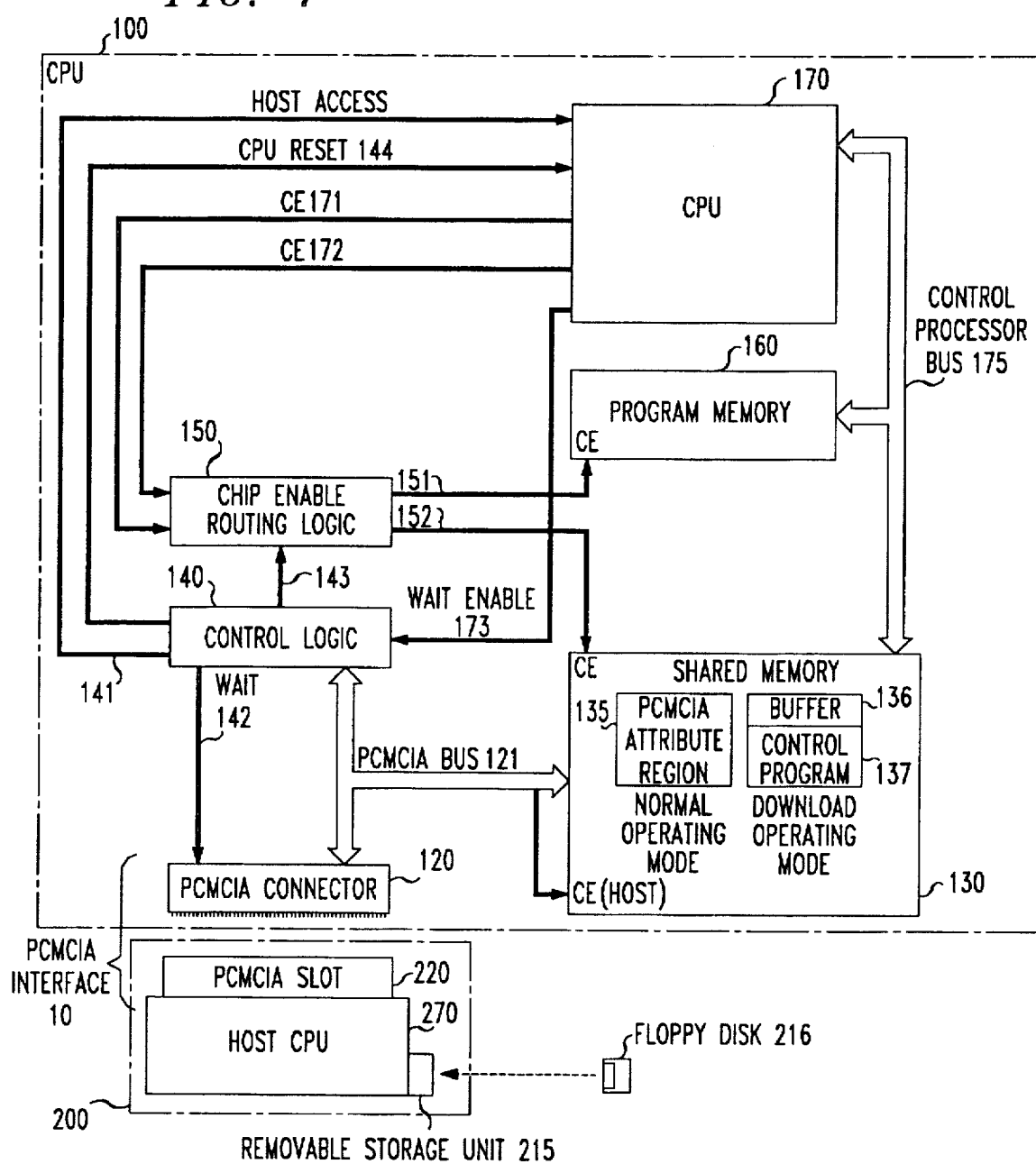
FIG. 1 is a block diagram of a portion of a PCMCIA modem embodying the principles of the invention.
FIG. 2 is a table implemented by chip enable routing logic 150 of FIG. 1.

FIG. 1 shows a portion of a PCMCIA modem that embodies the inventive concepts of this invention. As shown, host computer 200 includes PCMCIA slot 220 for receiving PCMCIA modem 100, host CPU 270, and removable storage unit 215 for receiving floppy disk 216. PCMCIA modem 100 includes CPU 170, program memory 160, shared memory 130, chip enable routing logic 150, control logic 140, and PCMCIA connector 120. CPU 170 is a microprocessor-based central processing unit which operates on, or executes, program data stored in program memory 160 or shared memory 130 (discussed below) via control processor bus 175, which provides control, address and data signals (not shown). PCMCIA modem 100 is physically and electrically coupled to host computer 200 via PCMCIA interface 10. The latter includes PCMCIA connector 120 of PCMCIA modem 100 and PCMCIA slot 220 of host computer 200. For the purposes of this example, program memory 160 is a flash memory. The program data stored in program memory 160 is hereinafter referred to as the operating computer program. This operating computer program provides the modem functionality for transmitting and receiving data via a communications facility (not shown).

It is assumed that CPU 170 includes appropriate address decode and chip enable logic. Two chip enable signals, CE1 and CE2, are provided by CPU 170 on lines 171 and 172, respectively. These chip enable signals are used to select either program memory 160 or shared memory 130. Normally, these chip enable signals would be coupled directly to these memory devices. However, in accordance with the principles of the invention, CE1 and CE2 are applied to chip enable routing logic 150, which provides chip enable signals to program memory 160 and shared memory 130 as a function of the mode of operation of PCMCIA modem 100. This is shown in FIG. 2. For the purposes of this example it is assumed that there are two modes of operation: a "normal mode" and a "download mode." During a normal mode, chip enable routing logic 150 provides CE1 to program memory 160, via line 151; and provides CE2 to shared memory 120, via line 152.

After a CPU reset signal is applied to CPU 170 via line 144, CPU 170 applies CE1 to chip enable routing logic 150. As is known in the art, after application of a reset signal, a micro-processor starts execution at a known starting address location. For the purposes of this example, it is assumed that this predefined location is mapped to an address range associated with CE1. The CPU reset signal on line 144 is provided by control logic 140 either as a result of RESET signal (not shown) defined in the PCMCIA interface being asserted, e.g., during a power-up condition; or as a result of a memory access by host CPU 270 (discussed below). In the normal mode of operation, as shown in FIG. 2, CE1 is routed to program memory 160 so that CPU 170 executes the operating computer program. In this normal mode, CPU 170 accesses shared memory 130 by providing CE2 on line 152 via chip enable routing logic 150.

Shared memory 130 is also known as a "dual port ram" and has two sets of address, data, and control lines. One set is used to interface to PCMCIA bus 121 and the other set is used to interface to control processor bus 175. In accordance with the principles of the invention, shared memory 130 is put to different use depending on the mode of operation. As shown in FIG. 1, during the normal mode of operation, shared memory 130 comprises PCMCIA attribute region 135, which includes the software definable Card Information Structure, Pin Replacement Register, Configuration Option Register, Card Configuration and Status Register in accordance with the PCMCIA interface standard. However, during the download mode of operation (discussed below), shared memory 130 includes region 136, which is a buffer that stores data received from host CPU 270 of host computer 200; and region 137, which stores a control program provided by host CPU 270 and subsequently executed by CPU 170.

In accordance with the principles of the invention, the other mode of operation—the download mode—directs CPU 170 to begin execution of program data from shared memory 130 after the application of a CPU reset signal on line 144. In particular, in the download mode of operation, chip enable routing logic 150 switches the CE1 signal from lead 151 to lead 152, and conversely, switches the CE2 signal from lead 152 to lead 151. As a result, CPU 170 now executes instructions stored in shared memory 130 after exiting from a reset condition.

Figure 3:
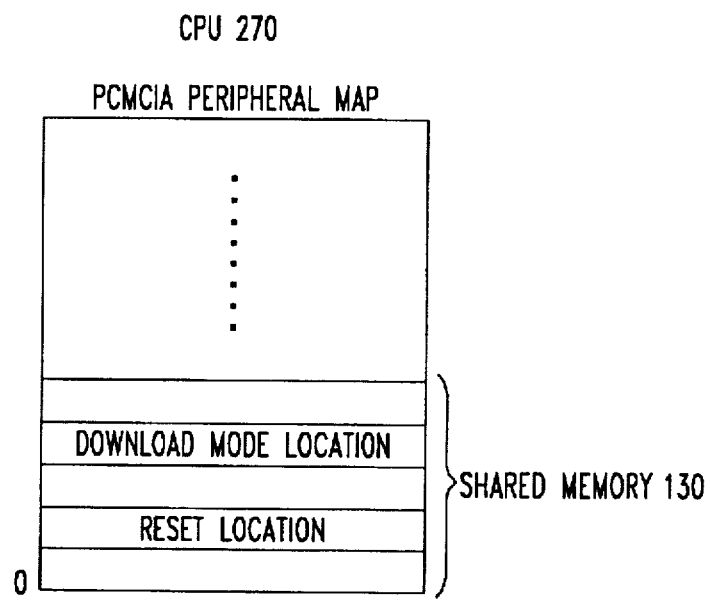
FIG. 3 illustrates a PCMCIA peripheral map for host computer 200 of FIG. 1.
Figure 4:
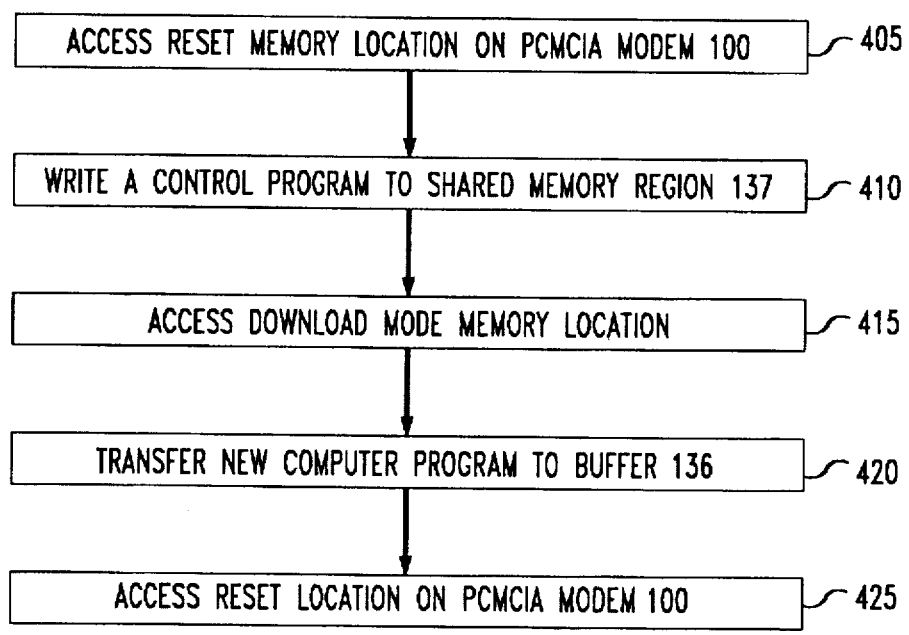
FIG. 4 is a flow diagram of a method embodying the principles of the invention.

Whether or not the download mode of operation is entered by PCMCIA modem 100 is under the control of host CPU 270. It should be noted that under the PCMCIA standard, portions, or all, of PCMCIA modem 100 is mapped into a part of the PCMCIA peripheral space of host CPU 270. An illustrative PCMCIA peripheral map of PCMCIA 100 as viewed by host CPU 270 is shown in FIG. 3. An illustrative method for use in host CPU 270 for switching PCMCIA modem 100 to the download mode is shown in FIG. 4. Host CPU 270 affects a reset of CPU 170 in step 405 by asserting the RESET signal of the PCMCIA interface, or by writing a particular data value to a particular memory location on PCMCIA modem 100 that is associated with resetting PCMCIA modem 100, i.e., a "reset location" as shown in FIG. 3. In this example, this reset location is within the shared memory region and during normal operation is associated with the Configuration Option Register, which is a pan of PCMCIA attribute region 135 as defined by the PCMCIA standard. One of the defined data bits of the Configuration Option Register is the "SRESET" bit. CPU 270 affects a reset of PCMCIA modem 100 by setting the "SRESET" bit, which is $d_7$, equal to a logical one. Control logic 140 of PCMCIA modem 100 detects this memory write to the reset location and in response thereto generates a CPU reset signal on line 144 to CPU 170.

While the CPU reset signal is active CPU 170 is inactive, i.e., performs no memory accesses. Host CPU 270 then writes a control program to shared memory region 137 in step 410. After step 410, host CPU 270 switches the mode of operation of PCMCIA modem 100 by accessing in a particular way a respective predefined memory location associated with the download mode in step 415. In this example, host CPU 270 performs three consecutive writes of a predefined data value to the download mode location. Control logic 140 of PCMCIA modem 100 detects these consecutive memory accesses and compares the data values being written by CPU 270 to the predefined data value. If the data values being written equal the predefined data value, control logic 140 applies a control signal on line 142 to chip enable routing logic 150. The latter alters the routing of the above-mentioned chip enable signals as shown in FIG. 2 for the download mode. It is assumed that steps 410 and 415 occur while the above-mentioned reset signal on line 144 is still active. In other words, it is assumed that control logic 140 generates a CPU reset signal of sufficient width to provide the time for host CPU 270 to perform steps 410 and 415. If host CPU 270 does not switch the mode of operation within the period of time when the CPU reset signal is active, control logic 140 blocks any subsequent attempts to switch modes and PCMCIA modem 100 simply continues to remain in the normal mode. In other words, control logic 140 provides a "lockout mechanism" that prevents inadvertent switching of chip enables. This lockout mechanism forces PCMCIA modem 100 to default to the normal mode after a CPU reset signal is applied unless host CPU 270 accesses in the prescribed manner the download mode location. Alternatively, to avoid this time constraint on host CPU 270, the latter can make use of the SRESET bit for turning on and off the CPU reset signal.

In the download mode and after removal of the CPU reset signal, CPU 170 executes the control program in shared memory 130. Host CPU 270 then transfers data to shared memory region 136 in step 420. This data represents portions of the new computer program to be placed into program memory 160. The control program, when executed by CPU 170, transfers the data placed in shared memory region 136 by host CPU 270 to program memory 160—thus changing the operating computer program executed by CPU 170 during the normal mode of operation. It should be noted that no boot block software is required to be resident in the PCMCIA peripheral other than the temporary control program provided by host CPU 270 in order to accomplish this download, irrespective of whether this download is a part of a field upgrade or the initial program load in a factory. It is assumed that the control program executed by CPU 170 includes a "hand-shaking" procedure for coordinating the transfer of data blocks from host CPU 270 to program memory 160. For example, after the data in shared memory region 136 is written by CPU 170 to a portion of program memory 160, CPU 170 writes to a predefined "flag" location of shared memory 130. This flag, when read by host CPU 270, indicates to host CPU 270 to write the next portion of the operating computer program to shared memory region 136.

After host CPU 270 has finished downloading the new operating computer program to PCMCIA modem 100, host CPU 270 again resets PCMCIA modem 100 in step 425. With the application of the CPU reset signal, control logic 140 switches PCMCIA modem 100 back to the normal mode as part of the lock-out mechanism described above. As a result, control logic 140 alters the routing of the above-mentioned chip enable signals as shown in FIG. 2 for the normal mode. In the normal mode and after removal of the CPU reset signal, CPU 170 executes the new operating computer program now stored in program memory 160.

As can be seen from the above description, when transferring data from the buffer located within shared memory region 136 to program memory 160, both CPU 170 and host CPU 270 are accessing shared memory 130. For example, at the same time CPU 170 is reading program data from shared memory region 137—host CPU may be attempting to write data to the buffer located within shared memory region 136. As a result, a memory contention scheme is required to arbitrate between CPU 170 and host CPU 270 when they attempt to access shared memory 130 simultaneously.

In this example, the memory contention scheme is implemented by a combination of hardware, represented by control logic 140, a software protocol, and the PCMCIA defined WAIT signal on line 142. Although shown as a separate signal for convenience, it should be realized that the WAIT signal on line 142 is a subset of PCMCIA bus 121.

Control logic 140 monitors PCMCIA bus 121 to detect any shared memory accesses by host CPU 270. When host CPU 270 begins a shared memory access to PCMCIA modem 100, control logic 140 activates the host access signal on line 141, which is received by CPU 170. In addition, CPU 170 provides a wait enable signal on line 173, which is received by control unit 140. If the wait enable signal is active, control unit 140 enables the generation of the WAIT signal on line 142 in response to any subsequent shared memory access by host CPU 270. As is known in the art, when the PCMCIA WAIT signal on line 142 is active, host CPU 270 inserts wait states in the current memory access. Conversely, if the wait enable signal is inactive, control unit 140 disables the generation of this WAIT signal so that no additional wait states are inserted into a shared memory access of host CPU 270. It should be noted that the PCMCIA specification requires that accesses by host computer 270 via PCMCIA connector 120 be completed with no more than a 12 microsecond delay.

Figure 5:
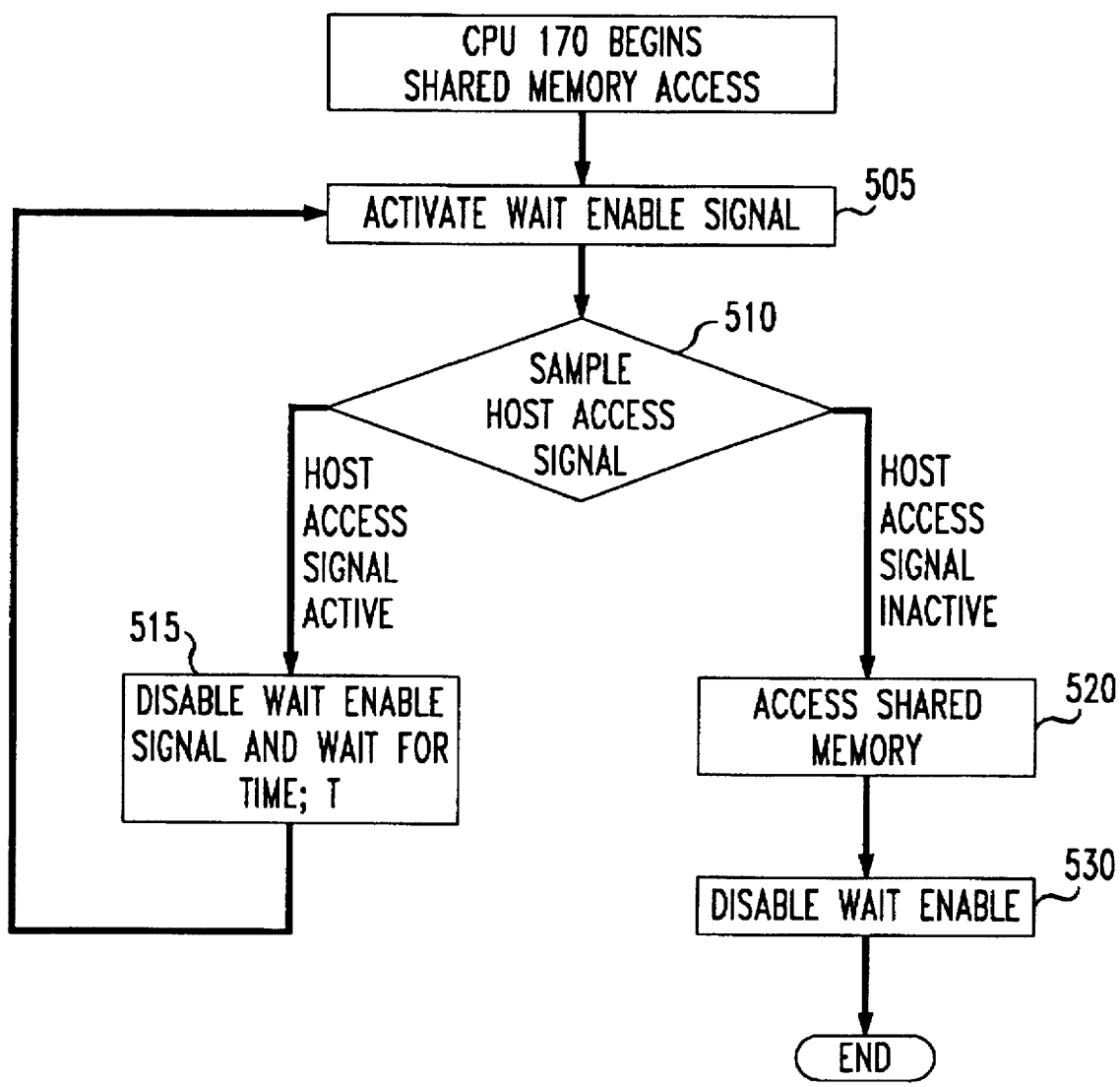
FIG. 5 is a flow diagram of a memory arbitration method performed by CPU 170 of FIG. 1.

FIG. 5 shows a flow diagram for a method used by CPU 170 for implementing a software protocol to control the generation of the wait enable signal on line 173. Whenever CPU 170 accesses shared memory, CPU 170 first activates the wait enable signal on line 173 in step 505. CPU 170 then reads, or samples, the host access signal on line 141 in step 510. This allows CPU 170 to check if host CPU 270 has already begun an access to shared memory. If the host access signal is active, then the wait enable signal on line 173 is disabled and CPU 170 itself waits for a predetermined period of time, T, in step 515 before returning to step 505. The latter step is important because host CPU 270 may ignore the WAIT signal on line 141 if it was enabled after the wait recognition window of host CPU 270. This may occur because of the asynchronous relationship of any shared memory accesses by the two processors. However, if the host access signal is inactive, CPU 170 accesses shared memory in step 520 and then disables the wait enable signal on line 173 in step 530.

As described above and in accordance with the principles of the invention, host CPU 270 is able to change the operating computer program stored in PCMCIA modem 100 and thereby provide an easy means to update or change the functionality of PCMCIA modem 100. As shown in FIG. 1, the program data executed by PCMCIA modem 100 can be provided to host CPU 270 via floppy disk 216. Indeed, any type of programs for PCMCIA modem 100 can be easily provided. For example, floppy disk 216 can supply a diagnostic testing program, which when downloaded by host CPU 270 allows PCMCIA modem 100 to perform a series of diagnostic tests.

In addition, the use of shared memory 130 in PCMCIA modem 100 also provides other improvements to system operation. For example, since the PCMCIA peripheral is a modem, host computer 200 is a data terminal. As is known in the art, host CPU 270 transfers data for transmission over a data communications channel (not shown) by writing data in parallel to a UART (not shown) of PCMCIA modem 100. This UART then converts the data to a serial form to simulate the serial data transmission from the data terminal. Consequently, the PCMCIA modem again converts the serial data stream from its UART back to a parallel form again. Unfortunately, this process tends to limit the speed of any data transfer. However, in accordance with the invention, shared memory 130 can be used to transfer user data between the data terminal and the modem at a a higher data transfer rate. This is accomplished by dedicating a portion of shared memory 130 as a buffer for directly transferring data from host computer 200 to PCMCIA modem 100.

In addition, in the prior art, the PCMCIA attribute structure is typically pre-defined and non-changeable, e.g., a read-only memory (ROM) is used to provide the PCMCIA attribute structure. However, the use of shared memory 130 allows for a software definable PCMCIA card information structure that can be dynamically altered by CPU 170.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was described in terms of utilizing flash memory, any non-volatile programmable RAM can be used. In fact, even volatile RAM can be used as long as the PCMCIA peripheral is properly initialized by the host computer on power-up of the system.

We claim:

1. Apparatus comprising:

a PCMCIA connector;

a processor responsive to a processor reset signal for providing a starting address for accessing a memory location to execute at least one instruction stored therein;

a first memory;

a second memory that is shared with a host computer via the PCMCIA connector and which stores PCMCIA attribute information in a first mode; and control circuitry coupled to a parallel data bus of the PCMCIA connector responsive to a system reset signal received from the PCMCIA connector for a:) providing the processor reset signal to the processor, and b) switching between the first and a second mode of operation;

where the system reset signal causes the control circuitry to alter the starting address provided by the processor in such a way that the memory location is located within the first memory in the first mode of operation, and in the second mode of operation, the system reset signal causes the control circuitry to alter the starting address provided by the processor means in such a way that the memory location is located within the second memory.

2. The apparatus of claim 1 further including the host computer.

3. The apparatus of claim 2 wherein the a system reset signal is at least one memory access by the host computer to the second memory via the PCMCIA connector.

4. The apparatus of claim 2 wherein the host computer includes a removable storage means for receiving from a disk inserted therein a plurality of instructions that is copied to the second memory.

\* \* \* \* \*